US009638112B2

(12) United States Patent
Laux et al.

(10) Patent No.: US 9,638,112 B2
(45) Date of Patent: May 2, 2017

(54) METHOD OF CONTROLLING A POWER TRAIN OF A VEHICLE AND DEVICE FOR CARRYING OUT SAID METHOD

(71) Applicant: BOMAG GmbH, Boppard (DE)

(72) Inventors: Robert Laux, Neuwied (DE); Timo Loew, Boppard (DE); Manfred Hammes, Emmelshausen (DE)

(73) Assignee: BOMAG GmbH, Boppard (DE)

( * ) Notice: Subject to any disclaimer, the term of this patent is extended or adjusted under 35 U.S.C. 154(b) by 397 days.

(21) Appl. No.: 14/344,194

(22) PCT Filed: Sep. 17, 2012

(86) PCT No.: PCT/EP2012/003868
§ 371 (c)(1),
(2) Date: Mar. 11, 2014

(87) PCT Pub. No.: WO2013/037500
PCT Pub. Date: Mar. 21, 2013

(65) Prior Publication Data
US 2014/0257671 A1    Sep. 11, 2014

(30) Foreign Application Priority Data
Sep. 15, 2011   (DE) .................. 10 2011 113 485

(51) Int. Cl.
*B60W 10/06*     (2006.01)
*F02D 28/00*     (2006.01)
(Continued)

(52) U.S. Cl.
CPC ............. *F02D 28/00* (2013.01); *B60W 10/06* (2013.01); *B60W 30/18045* (2013.01);
(Continued)

(58) Field of Classification Search
CPC .............. F02D 28/00; B60W 2540/16; B60W 2540/106; B60W 10/06; B60W 30/18045;
(Continued)

(56) References Cited

U.S. PATENT DOCUMENTS 5,277,269 A      1/1994  Ichimura et al.
5,473,895 A  *  12/1995  Bausenhart ............. F16H 61/47
                                                              180/307
(Continued)

FOREIGN PATENT DOCUMENTS

DE           44 25 130 A1      2/1995
DE    11 2008 002 977 T5      12/2010
(Continued)

OTHER PUBLICATIONS

The International Bureau of WIPO, International Preliminary Report on Patentability, International Application No. PCT/EP2012/003868, dated Mar. 18, 2014 (7 pages).
(Continued)

*Primary Examiner* — Hai Huynh
(74) *Attorney, Agent, or Firm* — Wood Herron & Evans LLP

(57) ABSTRACT

The present invention relates to a method and device for controlling a vehicle, more particularly, the power train of a compacting machine for earth moving operations, comprising a hydraulic travel pump and a hydraulic travel motor. Control is effected according to a specified control profile when a specified driving operation is to be carried out in that an adjustment of the travel pump is carried out which is independent of the rotational speed of the internal combustion engine. This makes it possible to retain, on the one hand, the rotational speed of the internal combustion engine in the case of abrupt stops of movement or changes in the direction of movement and, on the other hand, to adapt the rotational (Continued)

speed of the engine in the case of somewhat longer uninterrupted pauses between two changes in the traveling behavior, wherein comparatively large fluctuations in the rotational speed are avoided.

13 Claims, 3 Drawing Sheets

(51) Int. Cl.
- B60W 30/18 (2012.01)
- F16H 61/431 (2010.01)
- F16H 61/465 (2010.01)

(52) U.S. Cl.
CPC ......... *F16H 61/431* (2013.01); *F16H 61/465* (2013.01); *B60W 2540/106* (2013.01); *B60W 2540/16* (2013.01); *B60W 2710/0644* (2013.01); *B60Y 2200/413* (2013.01)

(58) Field of Classification Search
CPC .......... B60W 2710/0644; B60W 30/18; B60Y 2200/413; B60Y 2200/41; F16H 61/465; F16H 61/478; F16H 61/42; F16H 61/47; F16H 61/431; B60K 25/00
USPC .......................... 701/102, 110, 50; 123/436; 180/305–307
See application file for complete search history.

(56) References Cited

U.S. PATENT DOCUMENTS

| | | | | |
|---|---|---|---|---|
| 6,056,657 | A * | 5/2000 | Garnett | B60W 10/06 475/72 |
| 6,260,647 | B1 * | 7/2001 | Calamari | B60K 17/10 123/350 |
| 8,532,888 | B2 * | 9/2013 | Ishibashi | E02F 9/202 477/110 |
| 8,538,639 | B2 * | 9/2013 | Noll | B60W 10/06 701/102 |
| 8,701,818 | B2 * | 4/2014 | Shirao | E02F 9/22 180/305 |
| 8,972,124 | B2 * | 3/2015 | Mori | E02F 9/2066 123/339.1 |
| 9,179,600 | B2 * | 11/2015 | Kraus | A01F 29/14 |
| 2001/0041645 | A1 | 11/2001 | Nanri et al. | |
| 2004/0079077 | A1 * | 4/2004 | Yano | B60K 17/105 60/487 |
| 2004/0237681 | A1 * | 12/2004 | Wheals | B60W 30/18 74/335 |
| 2005/0143221 | A1 * | 6/2005 | Kuwahara | F16H 61/0213 477/97 |
| 2006/0014608 | A1 * | 1/2006 | Mitchell | B60W 10/06 477/107 |
| 2006/0096799 | A1 * | 5/2006 | Tatsuno | B60K 17/10 180/305 |
| 2007/0034294 | A1 * | 2/2007 | Chapman | A01G 23/067 144/334 |
| 2008/0184703 | A1 * | 8/2008 | Gerth | F16H 61/425 60/426 |
| 2008/0269011 | A1 * | 10/2008 | Sopko | B60K 6/46 477/34 |
| 2009/0029826 | A1 * | 1/2009 | Eguchi | B60T 7/02 477/39 |
| 2009/0069990 | A1 * | 3/2009 | Behm | F16H 61/421 701/55 |
| 2009/0071143 | A1 * | 3/2009 | Foster | F16H 61/47 60/445 |
| 2009/0127018 | A1 * | 5/2009 | Chisholm | B60W 10/06 180/307 |
| 2009/0139792 | A1 * | 6/2009 | Chisholm | B60W 10/06 180/307 |
| 2009/0145682 | A1 * | 6/2009 | Bohrer | B60W 30/1882 180/305 |
| 2009/0238696 | A1 | 9/2009 | Satake et al. | |
| 2009/0264252 | A1 * | 10/2009 | Bertsch | B60W 10/06 477/121 |
| 2010/0024412 | A1 * | 2/2010 | Hyodo | F16H 61/47 60/426 |
| 2010/0050620 | A1 * | 3/2010 | Basana | B60T 10/04 60/327 |
| 2010/0094515 | A1 * | 4/2010 | Shirao | B60W 10/06 701/50 |
| 2012/0065853 | A1 * | 3/2012 | Stoller | F16H 61/10 701/58 |
| 2012/0065854 | A1 * | 3/2012 | Stoller | F16H 61/702 701/60 |
| 2012/0151905 | A1 * | 6/2012 | Lenton | B60W 10/06 60/327 |
| 2012/0270699 | A1 * | 10/2012 | Stoller | B60W 10/06 477/110 |
| 2013/0136624 | A1 * | 5/2013 | Kitao | E02F 9/2079 417/212 |
| 2014/0075930 | A1 * | 3/2014 | Maiyur | F04B 13/00 60/327 |
| 2014/0257671 | A1 * | 9/2014 | Laux | B60W 10/06 701/102 |
| 2014/0290236 | A1 * | 10/2014 | Aizawa | F16H 39/02 60/443 |
| 2015/0267719 | A1 * | 9/2015 | Gorman | F15B 19/005 60/327 |
| 2015/0336609 | A1 * | 11/2015 | Smith | F16H 61/47 701/41 |
| 2016/0238130 | A1 * | 8/2016 | Ge | F16H 61/42 |
| 2016/0251827 | A1 * | 9/2016 | Ge | B60W 30/18 |

FOREIGN PATENT DOCUMENTS

| | | | |
|---|---|---|---|
| EP | 1 544 440 A1 | 6/2005 | |
| EP | 1 722 036 A2 | 11/2006 | |

OTHER PUBLICATIONS

Espacenet, English Machine Translation of DE4425130A1, published on Feb. 23, 1995 and retrieved from http://worldwide.espacenet.com on Mar. 10, 2014 (16 pages).

Espacenet, English Machine Translation of EP1722036A2, published on Nov. 15, 2006 and retrieved from http://worldwide.espacenet.com on Mar. 10, 2014 (12 pages).

European Patent Office, English Translation of International Search Report, International Application No. PCT/EP2012/003868, mailed Nov. 29, 2012 (3 pages).

European Patent Office, Written Opinion of the International Searching Authority, International Application No. PCT/EP2012/003868, mailed Nov. 29, 2012 (5 pages).

* cited by examiner

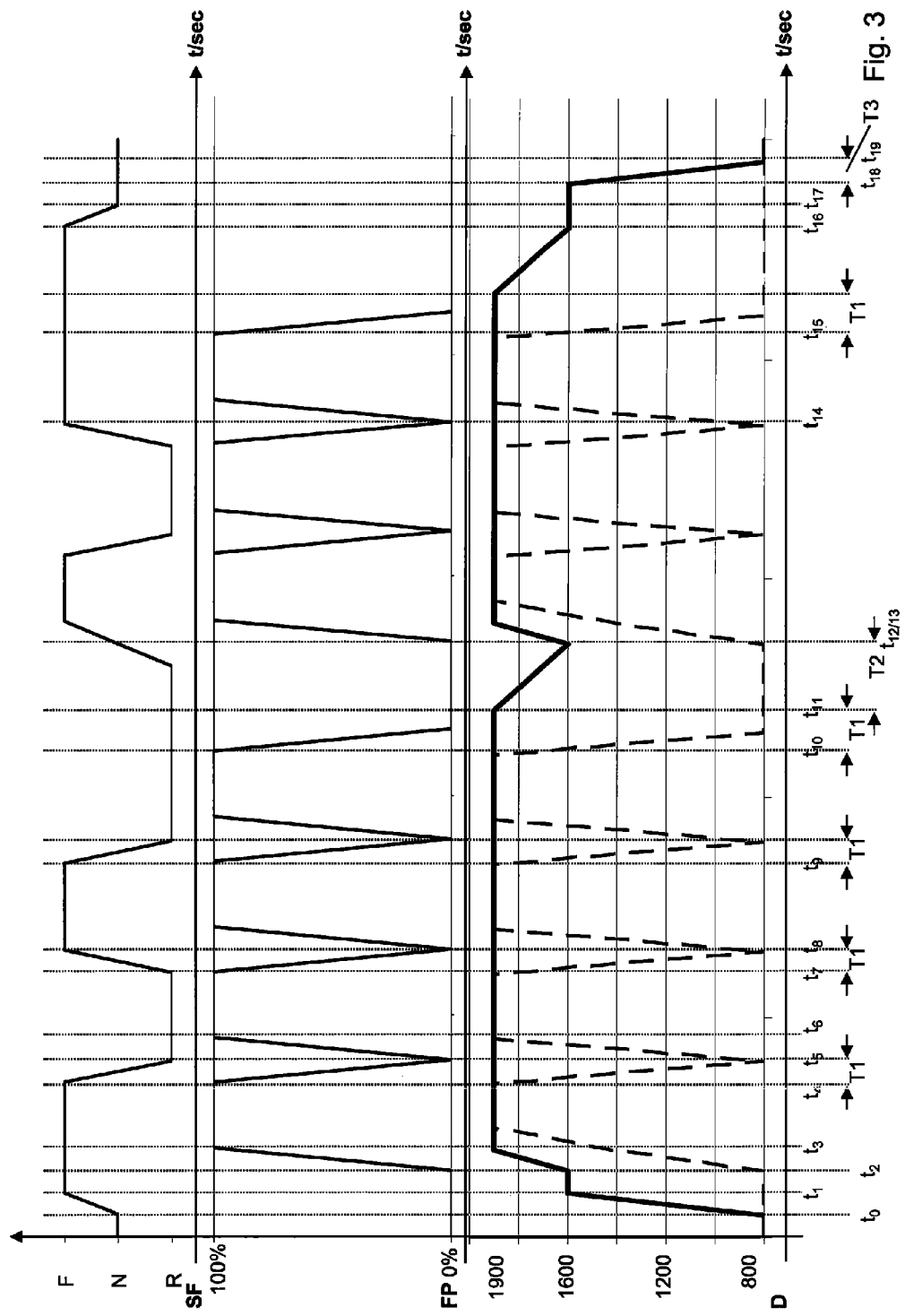

METHOD OF CONTROLLING A POWER TRAIN OF A VEHICLE AND DEVICE FOR CARRYING OUT SAID METHOD

CROSS-REFERENCE TO RELATED APPLICATIONS

This application is a submission under 35 U.S.C. §371 of International Application No. PCT/EP2012/003868, filed Sep. 17, 2012, which claims priority to German Application No. 10 2011 113 485.2, filed Sep. 15, 2011, the disclosures of which are hereby expressly incorporated by reference herein in their entireties.

FIELD OF THE INVENTION

The present invention relates to a method of controlling a power train of a vehicle, more particularly, the power train of a compacting machine used in earth moving operations, in which the travel pump is controlled independently of the rotational speed of the internal combustion engine according to a specific control profile when a specific driving operation is to be carried out. The present invention further relates to a device for carrying out said method, and to the use of said method on a soil compacting machine, more particularly, a landfill compactor, and to a soil compacting machine comprising such a device.

BACKGROUND OF THE INVENTION

In known compacting machines used in earth moving operations and having a hydraulic travel motor, an operator controls the performance of the power train via the rotational speed of an internal combustion engine. To this end, a feed pump is coupled to the output shaft of the internal combustion engine, which produces a control pressure proportional to the rotational speed of the internal combustion engine. The control pressure acts on a pressure-dependent travel pump adapted to act on the travel motor. The output of the travel pump is proportional to the control pressure, so that the speed of travel is likewise proportional to the rotational speed of the internal combustion engine. The speed of travel is thus strictly governed by the rotational speed of the internal combustion engine.

EP 1722036 A2 discloses a method of controlling the performance of compacting machines used in earth moving operations and an appropriate device. In this case, hydraulic power control of the travel motor is achieved by an adjustable flow control valve present between the travel motor and a feed pump in the hydraulic main line. By means of this valve, the volumetric flow rate of the fluid supplied to the travel motor is varied quantitatively in proportion to a controlled variable derived from a measurement of the stiffness of the soil to be compacted.

DE 4425130 A1 and DE 112008002977 T5 reveal methods of controlling the drive independently of the rotational speed of the internal combustion engine.

In practice, the direction of travel or the acceleration of the vehicle concerned must be frequently changed under certain operating conditions, which leads to unfavorable fuel consumption and to a high degree of wear on the internal combustion engine.

SUMMARY OF THE INVENTION

It is thus an object of the present invention to provide a method and device of the kind described above which reduce engine wear and fuel consumption.

In terms of method, this object is achieved by a method in which the control is determined by the operational timing of an accelerator pedal, and the control profile is set such that frequent changes in the rotational speed of the internal combustion engine and/or of the load thereon are avoided in that the rotational speed of the internal combustion engine is fixed over a first specified period of time, while the control profile is adjusted such that the rotational speed of the internal combustion engine follows a predetermined profile over a second specified period of time T2.

In terms of device, the object is achieved by providing the input side of a travel pump, supplying the travel motor, with a pressure control valve, which is controlled by a machine control system, the traction profile being stored in the machine control system. In principle, the present invention can be used on all vehicles that are subject to a frequent change in the direction of travel or to a frequent change in the speed of travel. A preferred use of the method and device refers to a self-propelled compacting machine or a landfill compactor.

The control profile is determined statically or dynamically depending on the position of the direction switch and the timing of the accelerator. The present invention makes use of the basic idea of operating the internal combustion engine under specific operating conditions or with a specific drive in its optimum operating range so that the internal combustion engine is not subjected to repeated changes of its rotational speed, especially not over a broad speed range. While with conventional control means, stopping and restarting, or a reversal of the direction of travel, of the machine concerned are only possible when the rotational speed of the internal combustion engine is reduced to idling speed and then subsequently increased to its rated speed, according to the present invention the rotational speed of the internal combustion engine remains in its optimum operating range even when the travel motor is stopped or switched in its direction of travel. Also, a decrease of the engine speed takes place in its partial load range.

The present invention thus has the advantage that the number of speed changes and load changes of the internal combustion engine is reduced, leading to lower fuel consumption and a higher service life of the internal combustion engine. Furthermore, the comfort of the operating person is increased, since the otherwise usual run-up through the rotational speed range is subjectively felt to be unpleasant. Also, the machine in question can be stopped while running at a preset rotational speed of its internal combustion engine above its idling speed including, for example, at the rated speed of the engine.

A preferred development of the present invention resides in the feature to the effect that the rotational speed of the internal combustion engine is fixed for a first specified period of time and alternatively or additionally follows a specified profile over a second specified period of time. By this means, it is possible, on the one hand, to maintain the rotational speed during brief movement stops or changes of direction and, on the other hand, when there are slightly longer breaks between two changes in drive characteristics, to adapt the engine rotational speed accordingly without any significant rotational speed fluctuations occurring. The course of the change in rotational speed over the second specified period of time can be effected preferably with a predetermined time delay and/or a predetermined flattening of that curve which would arise if said control were not available.

A particularly agile acceleration of the vehicle concerned is attained when the control profile is adjusted such that the rotational speed of the internal combustion engine is adjusted to a predetermined value in the idling mode (standby speed). The machine can be adjusted in motion in this way at a higher engine speed than is possible with conventional machines. A rotational speed equal to about 80% of the rated speed of the internal combustion engine is preferred.

It is also advantageous when the control profile is made up of typical driving patterns. It is known from practical experience with a machine that certain cycles of operation repeat themselves, for example, that a machine carries out a series of repetitive forward and reverse movements. This is typical, for example, of a landfill compactor. Since the timing of said forward and reverse movements is known, the control profile can be adjusted such that rotational speed fluctuations are avoided.

It has been found to be particularly advantageous when the control profile can be adjusted during operation of the machine. In this way, flexible adaptation to the current operating conditions can take place, for example, to the duration of successive forward and reverse movements, to changing loads, or to the topography in which the vehicle in question is moving, such as gradients, curves, or the like.

The control can be effected in a simple manner in that the control pressure determining the outflow rate is generated as a function of the predetermined control profile. This has the advantage that the present invention can be used on known control pressure-dependent pump control systems. Thus, existing machines can be retrofitted economically.

The solution provided by the present invention involving the use of a pressure control valve has the advantage that "hydraulic load-limit control" of the travel pump is retained. Thus, no electronic load limit control is necessary.

BRIEF DESCRIPTION OF THE DRAWINGS

The present invention is described below with reference to an exemplary embodiment, in which:

FIG. 3 shows diagrams of an accelerator position, a movement curve of a shift lever for the direction of travel, and the associated rotational speeds of an internal combustion engine of the soil compacting machine.

DETAILED DESCRIPTION OF THE INVENTION

Figure 1:
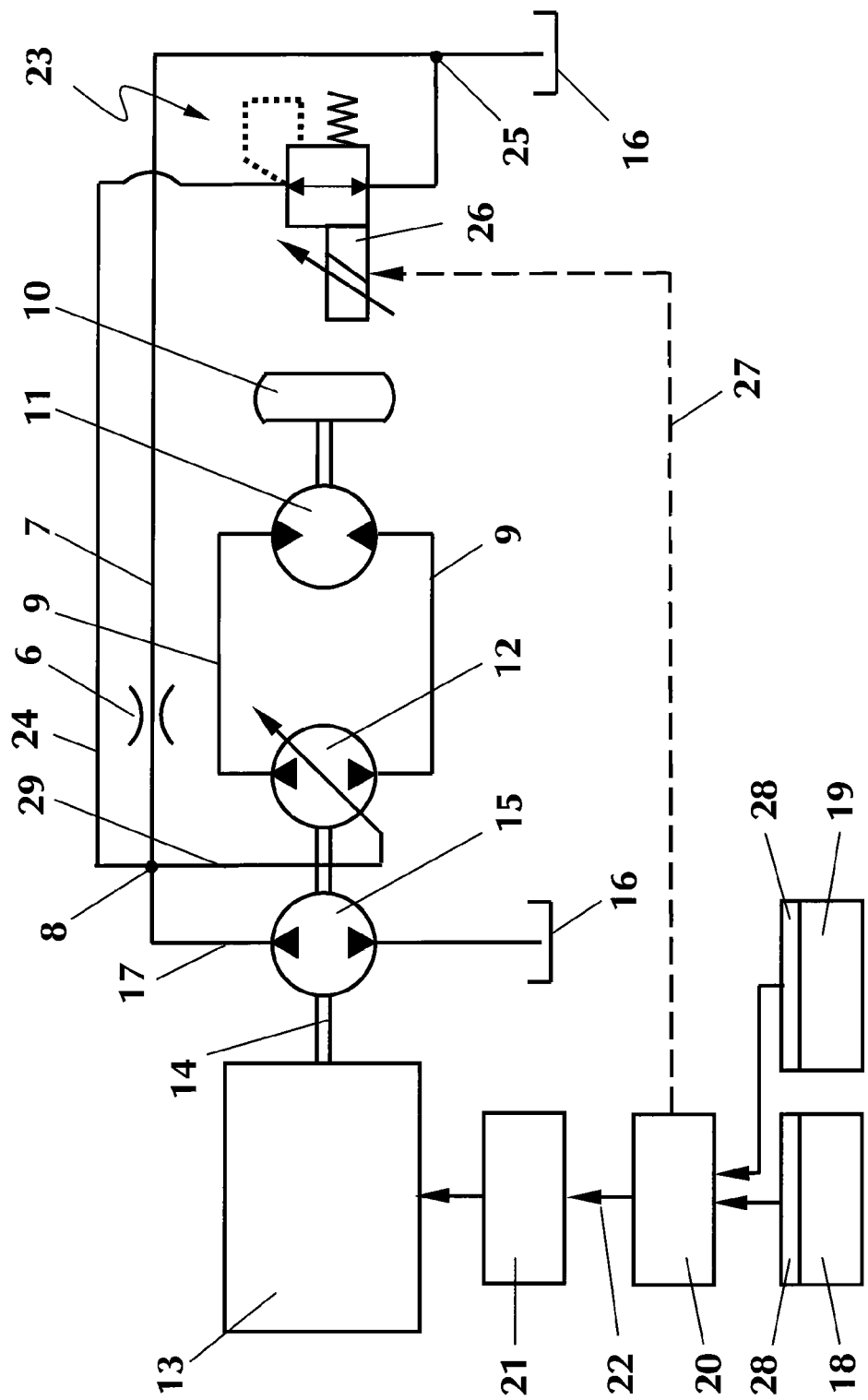
FIG. 1 is a hydraulic circuit diagram of a power train of a soil compacting machine.

According to FIG. 1, a wheel 10 of a soil compacting machine is driven by a power train comprising a hydraulic travel motor 11, a pressure-dependent travel pump 12, which can, for example, be configured as a hydraulic pump, a feed pump 15, and an internal combustion engine 13. The travel pump 12 supplies hydraulic fluid to the travel motor 11 via the lines 9. The output of the travel pump 12, which is proportional to the control pressure applied to a control line 29 on its input side, determines the speed of travel of the soil compacting machine. The control pressure in the control line 29 is referred to below as the "active control pressure."

The internal combustion engine 13 drives the travel pump 12 as well as the feed pump 15 via an output shaft 14. This feed pump boosts a main flow rate of hydraulic fluid from a tank 16 into a main line 17, which branches out at a junction 8 in the control line 29 to the travel pump 12 and a return pipe 7 to the tank 16. The feed pump 15 generates a control pressure in the main line 17 that is proportional to the rotational speed of the internal combustion engine 13, and is referred to below as the speed-dependent control pressure. The main line 17 is connected to the tank 16 via a throttle 6.

Furthermore, at the junction 8 there is a pressure regulating line 24 with a pressure control valve 23, which is controlled by an electronic machine control system 20. The pressure exerted in the pressure regulating line 24 is hereinafter referred to as the regulating pressure. The active control pressure in the control line 29 is thus determined by the speed-dependent control pressure in the main line 17 and also by the regulating pressure in the pressure regulating line 24, which is superimposed on the rotational speed-dependent control pressure. By changing the regulation pressure, it is possible to change the active control pressure and thus the outflow rate of the travel pump 12 without modifying the rotational speed of the internal combustion engine 13. The speed of travel can thus be changed via the machine control system 20 independently of the rotational speed of the internal combustion engine 13.

In the present example, the active control pressure in the control line 29 is regulated in that the rotational speed-dependent control pressure can be reduced via the pressure control valve 23. For this purpose, the pressure regulating line 24 is connected via a further junction 25 downstream of the valve 6 to the return pipe 7, i.e., the tank 16. Via the pressure control valve 23 a pressure balance can be obtained between the active control pressure at the input of the travel pump 12 and the pressure in the return pipe 7, which is equal to the tank pressure. In case of pressure reduction produced by the pressure control valve 23, the speed-dependent pressure at the junction 8, produced by the feed pump 15, is reduced accordingly, so that only the differential pressure prevails in the control line 29, even if the pumping performance of the feed pump 15, i.e., the main flow, is not reduced.

The active control pressure applied to the pressure-dependent travel pump 12 is thus determined by the speed-dependent control pressure of the feed pump 15 and, due to in an independent superimposition, by the pressure control valve 23. This means that the outflow rate of the travel pump 12 can be varied irrespective of the rotational speed of the internal combustion engine 13, by reducing the pressure in the active control line 29. Opening of the pressure control valve 23 causes a pressure drop to take place in the active control line 29 and thus a reduction of the speed of travel. When the speed-dependent control pressure is completely discharged into the main line 17 via the pressure control valve 23, the active pressure in the control line 29 is reduced to "zero" and the vehicle comes to a standstill. If, by appropriate control of the pressure control valve 23, active pressure in the control line 29 is again increased, the soil compacting machine starts moving again in accordance with the differential pressure at the junction 8. The speed of travel can thus be determined without changing the rotational speed of the internal combustion engine 13.

In the exemplary embodiment shown, the pressure control valve 23 is designed with a magnetic control coil 26 with armature and is provided with a reset spring. The pressure control valve 23 is controlled via a control signal from the machine control system 20, which is connected via a control line 27 directly with the input of the control coil 26 of the pressure control valve 23.

Using an accelerator pedal 18 designed as a drive sensor and a direction shift lever 19, an operator sets up the speed of travel and the desired direction of travel of the soil compacting machine. The accelerator pedal can also be designed as a joystick, valve, wheel, or the like, by means of which an operator controls acceleration and deceleration of the vehicle. The positions of the accelerator pedal 18 and the travel direction switch lever 19 are monitored by sensors 28. The respective output signals are passed to the electronic machine control system 20, which is located upstream of an electronic motor controller 21 and is connected thereto via a CAN bus 22 for example. The machine control system 20 controls, via the motor controller 21, the rotational speed of the internal combustion engine 13 and, via the pressure control valve 23, the speed of travel, as described above. To this end, the machine control system 20 evaluates the position of the accelerator pedal 18 and the travel direction switch lever 19 and generates a set value for the rotational speed of the internal combustion engine 13, which is passed to the motor controller 21, and generates the control signal for the control coil 26 of the pressure control valve 23, in each case as a function of a control profile determined statically or dynamically.

A static control profile is ascertained by tests and stored in the machine control system. During machine operation, the machine control system accesses this default profile. A dynamic determination is carried out in that during operation of the soil compacting machine frequently repeated driving and accelerating operations and/or driving cycles are determined, from which the control profile for the current operation is derived.

The control profile is based on the analysis of typical driving patterns of the soil compacting machine, these being reflected by the profile of changes in position of the accelerator pedal. The effect thereof is that on the occurrence of a typical profile of changes in position of the accelerator pedal, the travel motor will be controlled in accordance with the positions of the accelerator pedal, however, the rotational speed of the internal combustion engine 13 will not necessarily follow the position of the accelerator pedal 18. Instead, the speed of travel is determined by the control profile.

Typical driving patterns are accelerating and braking jerks and also changes between forward and reverse movements in frequent repetition. Depending on this pattern, only certain set values of rotational speed are specified, for example, a rotational rated speed, standby speed, and idling speed. Predetermined changes in position of the accelerator pedal 18 within a first predetermined period of time do not lead to a change in rated speed. Further predetermined changes in position within a second predetermined period of time lead to standby speed or idling speed. With the control profile, the curve of rotational speed fluctuations is smoothened, because a predetermined high frequency of positional changes of the accelerator pedal 18 does not entail a rotational speed change, unlike in conventional controls. The control profile selects the predetermined periods of time based on typical accelerating and braking operations and also on forward and reverse movements during operation of the soil compacting machine. The periods of time are adjusted such that during the succession of accelerating and braking operations within a typical period of time there is no rotational speed change, or rotational speed changes are delayed, preferably in predetermined stages.

Figure 2:
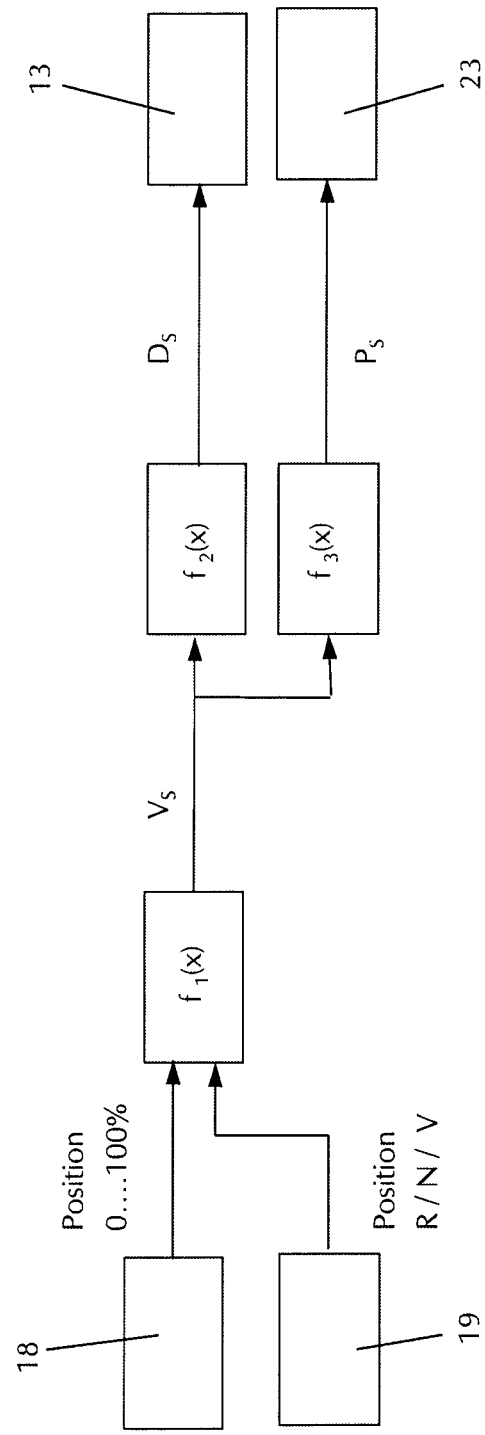
FIG. 2 is a functional block diagram of a controller system for a travel pump of the soil compacting machine.

According to FIG. 2, the control is based on the following functions. The current position of the accelerator pedal 18 is constantly queried, that is to say, as to whether the accelerator pedal 18 is being operated and, if so, to what extent. The resulting values can range from a minimum of 0% to a maximum of 100%. Together with the value derived from the position of the travel direction switch 19, a rotational speed set value $V_s$ is determined in a first function $f_1(x)$.

The rotational speed set value $V_s$ is subjected to a second and third function $f_2(x)$, $f_3(x)$ respectively. On the one hand, a rotational speed signal $D_s$ for controlling the internal combustion engine 13 is derived according to the second function $f_2(x)$. On the other hand, depending on the rotational speed set value $V_s$ and the rotational speed of the diesel engine (i.e., the internal combustion engine) a set value $P_s$ is generated for controlling the pressure control valve 23.

Using the second function $f_2(x)$ for producing the rotational speed signal $D_s$, a signal delay is produced, i.e., the rotational speed signal $D_s$ becomes active on the internal combustion engine 13 only after a specific delay time (dead time). In doing so, the rotational speed of the internal combustion engine 13 does not follow each actuation of the accelerator pedal 18. Rather, the actuations of the accelerator pedal 18, which take place within the predetermined time periods, are filtered out, and the rotational speed of the internal combustion engine 18 is thereby subject to fewer fluctuations. The controller thus also includes a low-pass filter function, according to which only those operations of the accelerator pedal 18 become active which are not carried out within the preset periods of time.

In addition, with said second function, constant speed values that can be optionally preset are taken into consideration which are maintained for optionally preset periods of time.

The control profile is explained with reference to an example using the diagrams of FIG. 3, in which the curve of the accelerator pedal position FP is shown on the basis of its deflection in percent, the position of the direction switch SF being shown in forward, reverse, and neutral positions, while the rotational speed D of the internal combustion engine is shown in revolutions per minute (n/rpm) against time in seconds (t/s).

The position SF of the direction switch above the time curve FP of the accelerator pedal position together illustrate a typical travel route of the soil compacting machine with frequent reversals. The direction switch lever of the soil compacting machine is first of all switched at time t0 from the neutral position N and, at the idling speed of the internal combustion engine (here 800 rpm), switched to the position of forward drive F. Thereupon, the rotational speed D controlled by the machine control system 20 (FIG. 1) is increased until it reaches a standby rotational speed (here 1600 rpm) at time T1, with no need for depression of the accelerator pedal. In order to restart movement of the machine, the accelerator pedal is depressed at time t2 and moved to the 100% position from the 0% position, the rotational speed of the internal combustion engine being increased and the vehicle being accelerated forward until it has reached its final rated speed (here 1900 rpm) and its final velocity at time t3. The accelerator pedal remains depressed at its maximum position and the vehicle travels forward at a constant speed up to the time t4, at which the accelerator pedal is returned to its 0% position and the vehicle brake is applied. At time t5 the direction switch is switched to reverse movement R. Thereupon, the vehicle is accelerated backwards by pressing the accelerator pedal at time t6 to cause it to travel backwards at constant speed. It is then slowed down again, at time t7, by releasing the accelerator pedal to 0%, and the direction switch is switched to forward movement F at time t8. The forward and reverse movements are then repeated according to the same time pattern, which is typical of operations carried out by a landfill compactor. The period of time extending between the commencement of braking, i.e., when the accelerator pedal leaves the 100% position, till the time when the subsequent acceleration is complete, i.e., when the accelerator pedal position returns to the 100% position, is typically approx. 2 to 3 seconds.

In a conventional rotational speed control system, repetitive starting and braking as indicated by the dash-dot line would lead, four times, to an increase in the rotational speed up to a rated speed of 1900 rpm and, four times, to a decrease in the rotational speed to the idling speed. The first rotational speed increase would be based on the idling speed at time t2, when the accelerator pedal is depressed.

According to one aspect of the present invention, said control profile for the rotational speed of the internal combustion engine over this period of time is obtained from the described drive route in the following manner. Starting from the idling speed, the rotational speed of the engine is raised to the standby speed on actuation of the direction switch at time t1, which standby speed is reached prior to time t2 and is equal to preferably approx. 80% of the rated speed, here 1600 rpm. This has the result that the machine can accelerate at time t2 in a more agile fashion than with a conventional controller, since the internal combustion engine can provide a higher torque at this stage. Furthermore, the rated speed at time t3 is reached sooner than in a conventional controller. When braking is commenced at time t4, the rated speed is maintained constant for a pre-settable first period of time T1. If, as in the present example, the accelerator pedal is again depressed at time t5 within this first interval of T1, the rated speed then remains constant including during the subsequent acceleration. This applies to the first three brake applications at the time points t4, t7, and t9 and the subsequent accelerations depicted in FIG. 3.

If, after the accelerator pedal as been reset to 0%, as at time t10, and the following first period of time T1 has lapsed, there is no depression of the accelerator pedal, as at time t11, the rotational speed is slowly reduced within a second period of time T2 until it reaches the standby rotational speed, as is the case in the present example at time t12, or until the accelerator pedal is again depressed at time t13. If the accelerator pedal is depressed for acceleration, as shown in the present example at time t12, the rated speed is reset. The engine's rotational speed does not fall below the standby speed during the entire period of movement, i.e., as long as the direction switch is set to forward or reverse movement.

In the example illustrated, a forward movement and a reverse movement ensue following time t12, as described above, followed, at time t14, by a final forward movement, which is braked at time t15 by releasing the accelerator pedal. During the subsequent first period of time T1, no renewed actuation of the accelerator pedal takes place. Therefore, the rotational speed is reduced to standby rotational speed, which it reaches at time t16.

In the example, at the time t17, the direction switch is adjusted to the neutral position N, i.e., the traveling operation is terminated. There is then a slow reduction of the rotational speed, starting at time t18, to the idling speed within a pre-settable third period of time T3, in this case 2 seconds, which idling speed is reached at time t19. The standby rotational speed is only resumed if the direction switch lever has in the meantime again been actuated.

Thus, the change of rotational speed takes place in a predetermined sequence between three rotational stages, i.e., the idling speed, the standby speed, and the rated speed.

If the accelerator pedal is depressed when the direction switch lever is in the neutral position N, the rotational speed of the internal combustion engine is regulated by the machine control system without using the control profile. Furthermore, the use of the control profile can be switched off, for example, for maintenance and repair work.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A method of controlling a power train of a vehicle, the power train comprising a travel pump, wherein an adjustment of a travel pump driven by an internal combustion engine is made and in which control of the power train takes place independently of a rotational speed of the internal combustion engine according to a specific control profile when a specific driving operation is to be carried out,
wherein the control is determined by an operational timing of an accelerator pedal, and
the rotational speed of the internal combustion engine is fixed over a first specified period of time T1, and the control profile is set such that the rotational speed of the internal combustion engine follows a predetermined profile over a second specified period of time T2, and
wherein the periods of time are adjusted such that during the succession of accelerating and braking operations within a typical period of time there is no rotational speed change,
and further wherein typical periods of time are determined dynamically, in that during operation, frequently repeated driving and accelerating operations and/or driving cycles are determined, from which the typical periods of time for the current operation are derived.

2. The method according to claim 1, wherein the control profile is set such that the rotational speed of said internal combustion engine does not fall below a preset value (standby speed) during the driving operation.

3. The method according to claim 1, in which a rotational speed-dependent control pressure is produced for a pressure-dependent travel pump of a travel motor, wherein said control profile is produced from driving patterns of a typical driving operation.

4. The method according to claim 3, wherein said control profile is produced with consideration for frequent reverse drives.

5. The method according to claim 1, wherein a control pressure acting on said travel pump is produced as a function of said predetermined control profile.

6. The method according to claim 5, wherein said control pressure governed by the rotational speed of said internal combustion engine and acting on said travel pump is reduced as a function of said control profile.

7. A device for carrying out the method according to claim 1, wherein, on an input side of a travel pump acting on a travel motor, a pressure regulating valve is present which is controlled by a machine control system, and said traction profile is stored in the machine control system.

8. The device according to claim 7, wherein said pressure regulating valve is located between the input of said travel pump and a storage tank for hydraulic fluid.

9. The device according to claim 7, wherein sensors for monitoring a direction switch and/or an accelerator pedal are provided which are connected at an output to said machine control system.

10. The use of a method according to claim 1 on a compacting machine for earth moving operations.

11. The use of a method according to claim 1 on a landfill compactor.

12. The method according to claim 1, wherein the power train of the vehicle is the power train of a compacting machine used in earth moving operations.

13. A soil compressing machine for earth moving operations, comprising a power train which comprises an internal combustion engine and a travel pump,
  wherein a control system is present which actuates the travel pump independently of the rotational speed of the internal combustion engine when a specified driving operation is to be carried out, and a specified control profile is stored in the control system, and
  wherein the control profile selects predetermined periods of time based on typical accelerating and braking operations and also on forward and reverse movements during operation of the soil compressing machine, and
  wherein the periods of time are adjusted such that during the succession of accelerating and braking operations within a typical period of time there is no rotational speed change,
  and further wherein typical periods of time are determined dynamically, in that during operation, frequently repeated driving and accelerating operations and/or driving cycles are determined, from which the typical periods of time for the current operation are derived.

* * * * *